(12) United States Patent
Parker, III et al.

(10) Patent No.: US 11,993,348 B2
(45) Date of Patent: May 28, 2024

(54) INFLATABLE NOSE CONE SYSTEM

(71) Applicant: Parker Maritime Technologies, LLC, Rhinecliff, NY (US)

(72) Inventors: William J. Parker, III, Rhinecliff, NY (US); Katherine Howell Brinson, Brooklyn, NY (US); James E Riseborough, Bolton, MA (US)

(73) Assignee: Parker Maritime Technologies, LLC, Saratoga, CA (US)

( * ) Notice: Subject to any disclaimer, the term of this patent is extended or adjusted under 35 U.S.C. 154(b) by 478 days.

(21) Appl. No.: 17/503,654

(22) Filed: Oct. 18, 2021

(65) Prior Publication Data
US 2023/0120100 A1 Apr. 20, 2023

(51) Int. Cl.
| | |
|---|---|
| *B63B 1/32* | (2006.01) |
| *B63B 7/00* | (2020.01) |
| *B63B 7/08* | (2020.01) |
| *B63B 15/00* | (2006.01) |
| *B63B 17/00* | (2006.01) |
| *B63B 17/02* | (2006.01) |

(52) U.S. Cl.
CPC ............ *B63B 1/322* (2013.01); *B63B 1/32* (2013.01); *B63B 7/082* (2013.01); *B63B 15/00* (2013.01); *B63B 17/02* (2013.01); *B63B 2007/003* (2013.01); *B63B 2017/0045* (2013.01); *Y02T 70/10* (2013.01)

(58) Field of Classification Search
CPC ..... B63B 1/32; B63B 1/322; B63B 2007/003; B63B 2007/006; B63B 7/08; B63B 7/082; B63B 15/00; B63B 17/00; B63B 17/02; B63B 2017/0045; B62D 35/00; B62D 35/001; B62D 35/002; B62D 35/004; B62D 35/005; B62D 37/00; B62D 37/02; B62D 37/04
See application file for complete search history.

(56) References Cited

U.S. PATENT DOCUMENTS

| | | | | |
|---|---|---|---|---|
| 2,689,579 | A * | 9/1954 | Sartori | B63B 17/02 135/96 |
| 3,190,300 | A * | 6/1965 | Jack | E04H 15/38 D21/837 |
| 4,843,997 | A * | 7/1989 | Doehmel | B63B 17/00 114/67 R |
| 5,655,559 | A * | 8/1997 | Zembik | E04H 15/38 135/147 |
| 9,150,283 | B2 * | 10/2015 | Braaten-Boyd | B63B 17/02 |

FOREIGN PATENT DOCUMENTS

| | | | | | |
|---|---|---|---|---|---|
| KR | | 20180001166 | U | * | 4/2018 |
| KR | | 20180043064 | A | * | 4/2018 |
| KR | | 20180047431 | A | * | 5/2018 |
| KR | | 20220028309 | A | * | 3/2022 |
| WO | WO-2023247978 | A1 | * | 12/2023 | ............ B63B 15/00 |

* cited by examiner

*Primary Examiner* — Ajay Vasudeva
(74) *Attorney, Agent, or Firm* — Morrison & Foerster LLP

(57) ABSTRACT

The present invention provides a nose cone system that comprises an inflatable body, a plurality of retainer ribs, a retainer trough positioned below the inflatable body, a plurality of winches attached along the outer surface of the retainer trough, and a plurality of winch straps with which to pull in the inflatable body as it is deflated while holding it in place, in coordination with the winch.

5 Claims, 6 Drawing Sheets

INFLATABLE NOSE CONE SYSTEM

FIELD OF THE INVENTION

The present invention generally relates to ship systems. More specifically, the present invention relates to a novel system designed to reduce turbulent airflow across the front portion of ships.

BACKGROUND OF THE INVENTION

A system to reduce turbulent airflow across the front portion of ships is in demand. As a vessel moves through water, it can experience a force acting opposite to its direction of motion. For example, during navigation, boats and ships suffer resistance such as water resistance and windage. This resistance can affect ship propulsion and maneuverability, so reducing the resistance acting on ships is a well-known way of reducing ship fuel consumption.

Because the impact of airflow can be particularly acute for large ships, there is a need to develop a device that is designed to reduce resistance during a ship's navigation, thereby reducing the consumption of fuel oil.

The present invention is intended to address problems associated with and/or otherwise improve on conventional systems and devices through an innovative inflatable nose cone system that is designed to provide a convenient and effective means of reducing turbulent airflow across the front portion of ships while incorporating other problem-solving features.

SUMMARY

In accordance with the present invention, a novel nose cone system is provided that requires an inflatable body, a plurality of retainer ribs, a retainer trough positioned below the inflatable body, a plurality of winches attached along the outer surface of the retainer trough, and a plurality of winch straps with which to pull in the inflatable body as it is deflated while holding it in place, in coordination with the winch.

In one embodiment, the present invention can be welded to the deck of a ship, and when fully inflated its size can be suitable for the size of a ship. The present invention can be large enough to protect a ship's bow and cargo from turbulent winds approaching the bow of the ship.

The present invention is configured to be easily incorporated into the construction or retrofitting of maritime displacement vessels of varying sizes and hull forms while interfering only minimally with cargo space, carriage capacity, and handling.

The present invention provides laminar airflow across the main deck of ships at sea and is designed to reduce the blunt impact of wind across the bow of a ship, thereby reducing turbulent flow and increasing the efficiency of the ship's transit.

DETAIL DESCRIPTIONS OF THE INVENTION

Figure 1:
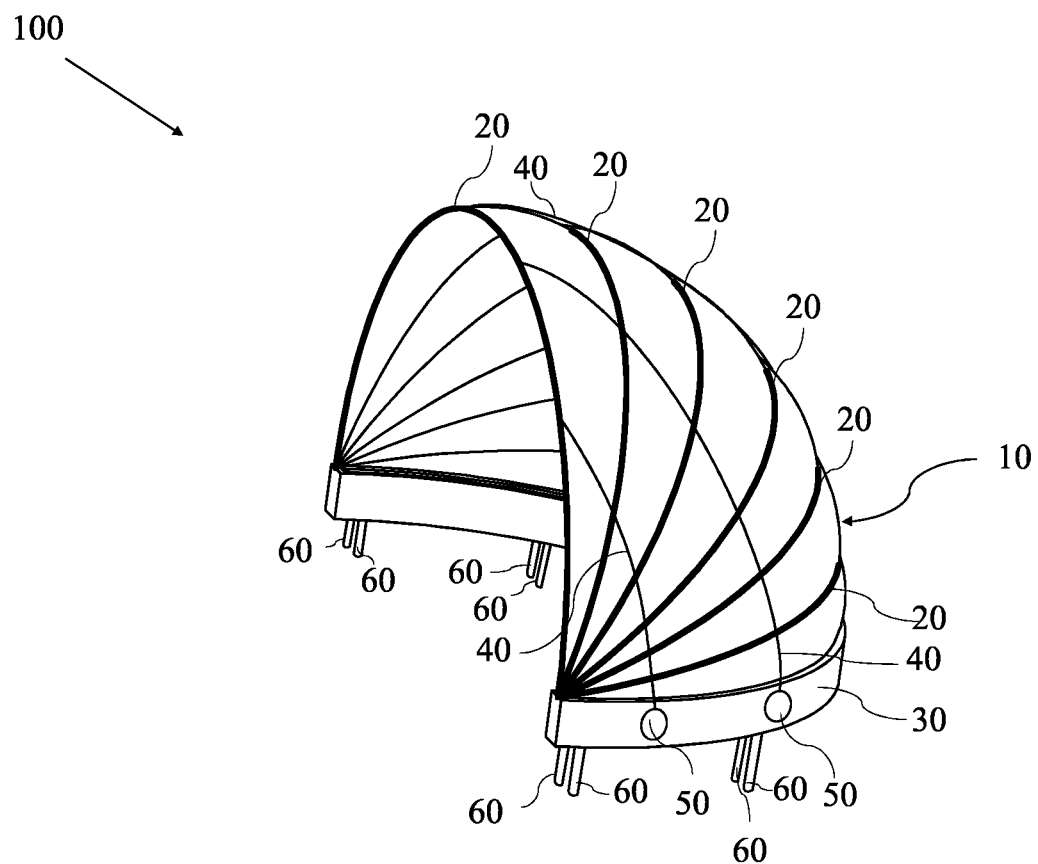
FIG. 1 is an illustration of one embodiment of present invention.
Figure 2:
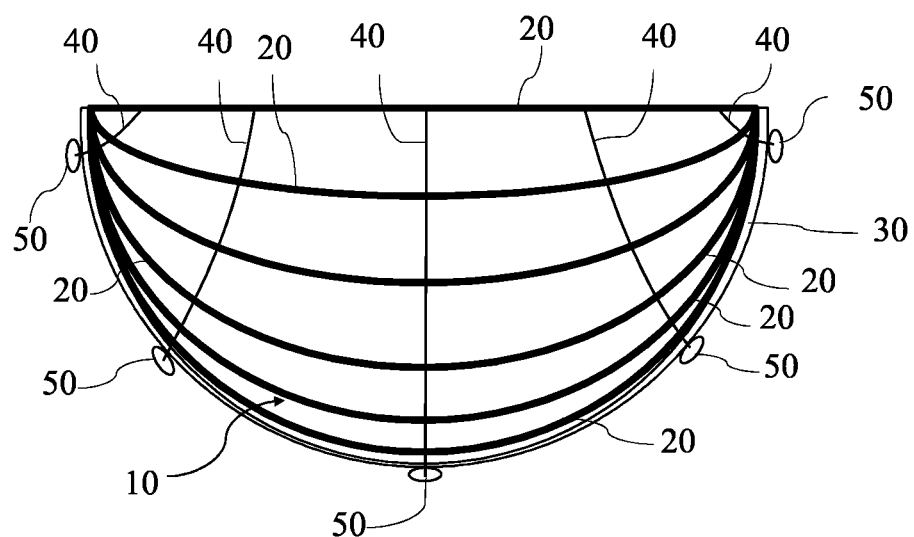
FIG. 2 is an illustration showing the top view of present invention.
Figure 3:
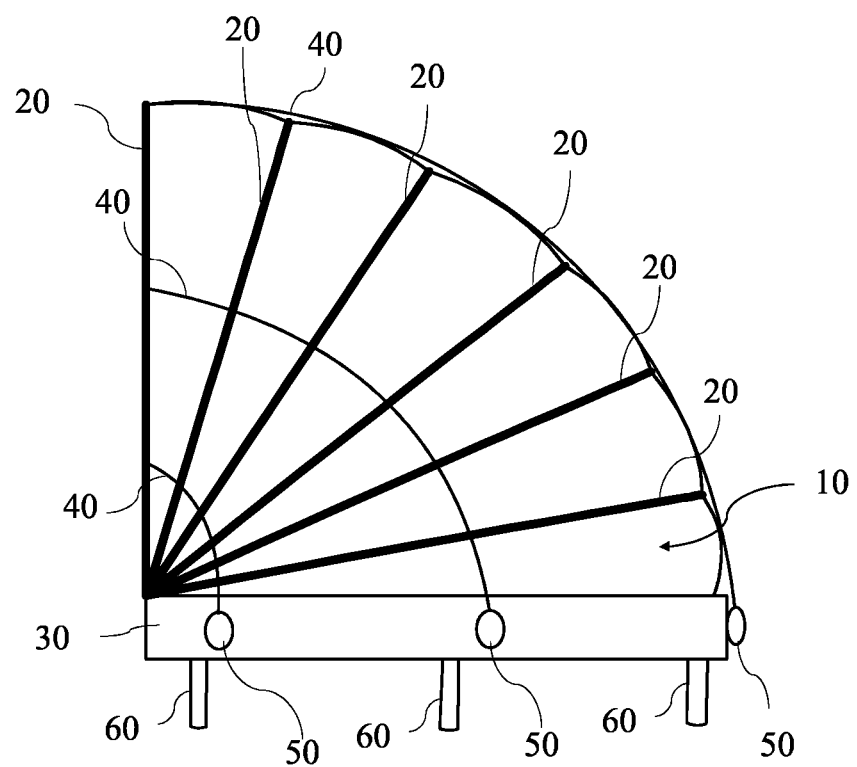
FIG. 3 is an illustration showing the side view of present invention.

All illustrations of the drawings are for the purpose of describing selected versions of the present invention and are not intended to limit the scope of the present invention.

The present invention discloses a nose cone system that reduces ship wind resistance. The present invention is easy to install, clearly reduces turbulent flow across the main deck, and streamlines ships while functioning in all modes of transit.

The present invention can be easily incorporated into the construction or retrofitting of maritime displacement vessels of varying sizes and hull forms without requiring dry-docking requirement, weakening the existing hull, or interfering with shipboard equipment, systems, or discharges. The present invention can be easily installed or retrofitted aboard a vessel while interfering only minimally with cargo space, carriage capacity, and handling.

The present invention provides laminar airflow across the main deck of ships at sea. Because many oceangoing vessels stack their main decks as high and wide as possible and often have flat superstructures, the present invention can help reduce the blunt impact of wind across the bow of a ship, thereby reducing turbulent flow and increasing the efficiency of the ship's transit.

As shown in FIGS. 1 to 4, the present invention provides a nose cone system 100 that comprises an inflatable body 10, a plurality of retainer ribs 20, a retainer trough 30, a plurality of winch straps 40, a plurality of winches 50, and a plurality of hull mounting feet 60.

The retainer ribs 20 are coupled to the inflatable body 10, which is secured to the retainer trough 30. The winches 50 are attached to the retainer trough 30 and connected to the inflatable body 10 by the winch straps 40 in such a way that the inflatable body 10 can be inflated or deflated, with movement of the inflatable body 10 guided by the winch straps 40.

All components of the present invention not only help produce, distribute, and sustain reductions to turbulent flow but also ensure the system's structural integrity, durability, and non-interference with vessel operations.

Figure 5:
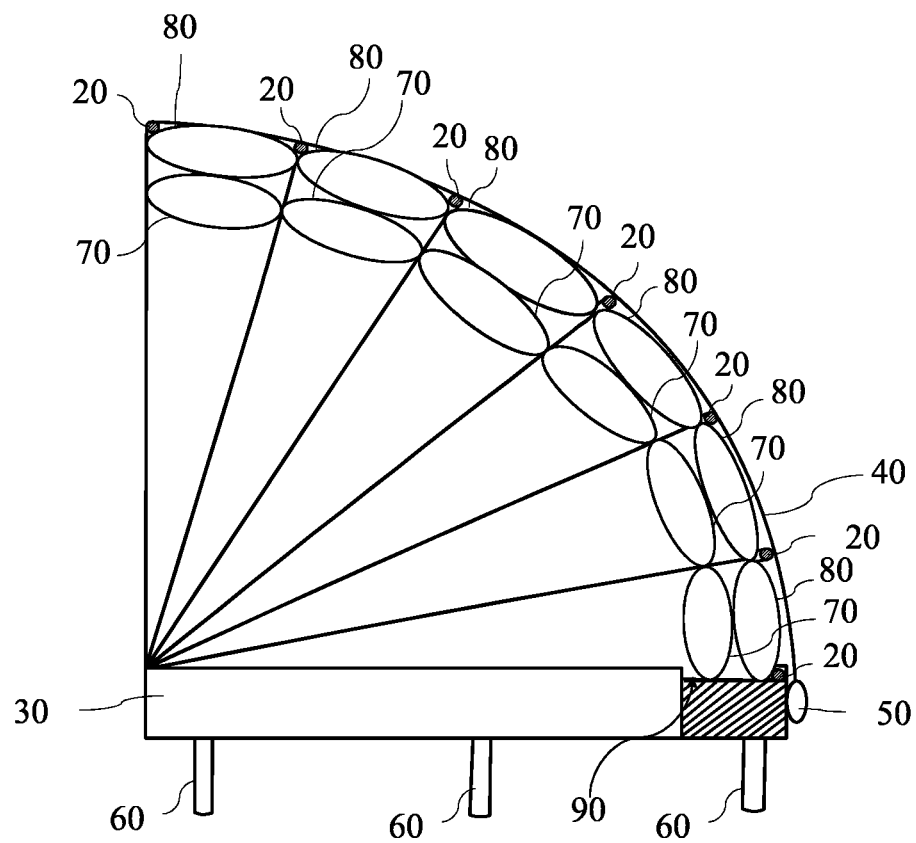
FIG. 5 is an illustration showing the cross-sectional view of present invention.

In one embodiment, the inflatable body 10 can be a half-dome-shaped body that includes a plurality of inner air bladders 70 and a plurality of outer air bladders 80, as shown in FIG. 5.

The inner air bladders 70 and outer air bladders 80 can be balloon-like elastic members that are inflated with air. The inner and outer air bladders 70, 80, once inflated, can be configured to streamline the airflow across the bow of a ship. The inner and outer air bladders 70, 80 can be made of polyvinyl chloride (PVC), a specially coated fabric, and a polyester, nylon, or neoprene interior. In one embodiments, the inner air bladders and outer air bladders 70, 80 can be elongated balloons that can be inflated or deflated. In some embodiments, the longitudinal ends of the inner air bladders 70 and outer air bladders 80 can be substantially pointed.

In some embodiments, the inner and outer air bladders 70, 80 can be connected to each other by a fastener or adhesive known in the art, in such a way as to form a half-dome-shaped body when they are inflated. For example, the inner air bladder 70 can be physically located on the inner portion of the half-dome-shaped body facing aft when the ship transits. The outer air bladder 80 can be physically located on the outside portion of the half-dome-shaped body facing forward when the ship transits.

The inner and outer air bladders 70, 80 can be deflated during installation, while the ship is in harbor, and amid high winds and/or seas. The inner and outer air bladders 70, 80 can be inflated to serve as the visible half-dome-shaped body of the present invention.

In some embodiments, the inner and outer air bladders 70, 80 can be guided and supported by steel trusses (retainer ribs that will be described below) and moved into place (fully inflated or deflated) with winches 50.

In some embodiments, the inner and outer air bladders 70, 80 may include a plurality of air valves (not shown) to inflate and pressurize the bladders and maintain a proper seal on pressurization while permitting quick, effective discharge of the contained air when the inner and outer air bladders 70, 80 are deflated. The air valves can be of any type known in the art.

Figure 4:
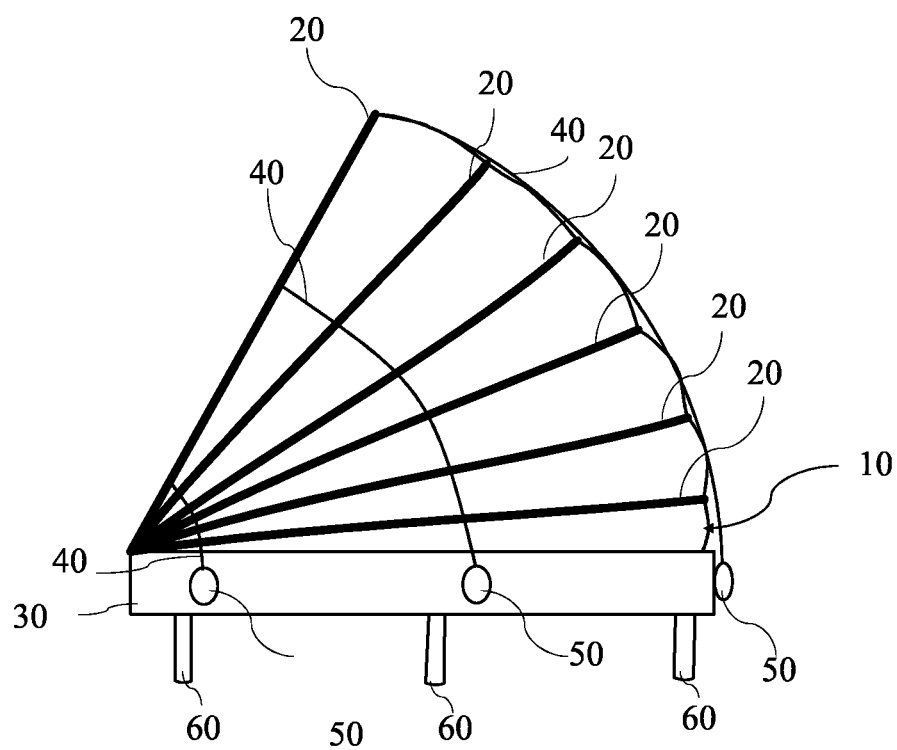
FIG. 4 is an illustration showing the side view of present invention in a partially folded state.

The inner and outer air bladders 70, 80 can be inflated using any air pumps (not shown) of varying capacities suited to the overall size of the present invention. The air pump, which can be packaged with the present invention and mated to the air valves to inflate the inner and outer air bladders 70, 80, can be an electric air pump. In one embodiment, each valve can be manually opened for deflation, or the valve can be designed to allow deflation when the winch straps 40 (described in detail hereafter) pull in the inner and outer air bladders 70, 80 to fold the inflatable body 10 as shown in FIG. 4.

The retainer ribs 20 are designed to guide the inner and outer air bladders 70, 80 from and to the retainer trough 30 and full inflation/deflation position. The retainer ribs 20 can be fabricated from mild steel in a truss shape. The retainer ribs 20 can be attached to the inflatable body 10 to support the half dome shape of the inflatable body 10 when the inflatable body 10 is fully inflated. For example, each retainer rib 20 can be made of mild steel tubing and bent to conform to the inflated shape of the present invention. In some embodiments, the ends of the retainer ribs 20 can be mounted rotatably to the retainer trough 30 so that the central area of each retainer rib 20 can move up and down as the inner and outer air bladders 70, 80 are being inflated and deflated. Any other mounting mechanism known in the art that would permit the up and down movement of the central area of the retainer ribs 20 mounted to the retainer trough 30 can be used.

Each retainer rib 20 can be suitably galvanized or otherwise coated against atmospheric degradation. The retainer ribs 20 can be a curved rod with a circular cross section. The retainer ribs 20 can alternatively have any other suitable circular cross section.

It is anticipated that, in addition to the retainer ribs 20, the present invention may include any type of curved telescoping members to support the shape of the inflatable body 10.

The retainer trough 30 may include any suitable cross-section and can be positioned below the inflatable body 10. The function of the retainer trough 30 is to securely retain the inflatable body 10 in position upon attachment of the bottom edge of the inflatable body 10 to the retainer trough 30.

Figure 6:
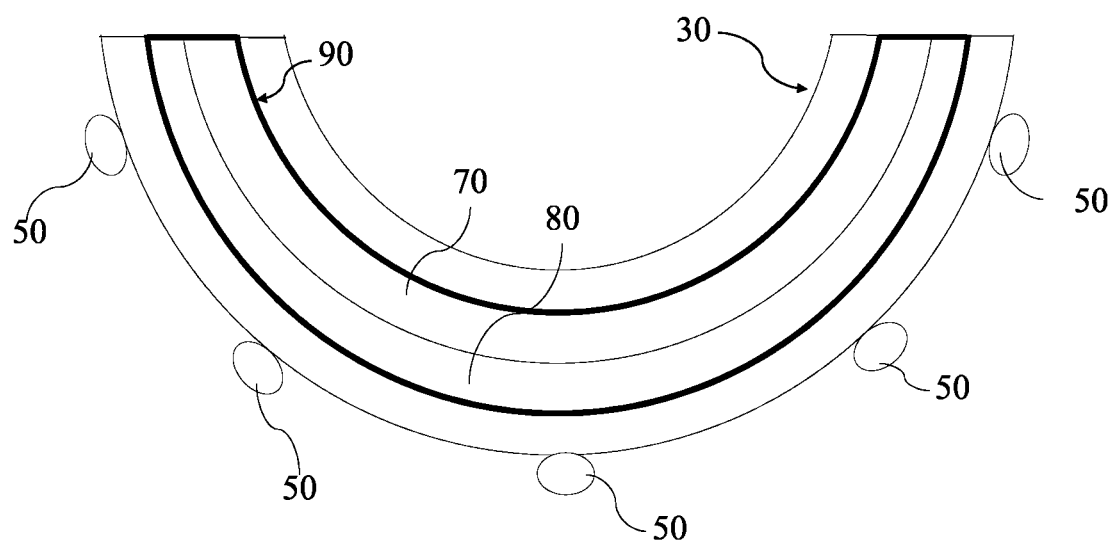
FIG. 6 is an illustration showing the top view of the retainer trough of the present invention.

As shown in FIGS. 5 and 6, in some embodiment, the retainer trough 30 can include a channel 90 to accommodate the bottom edge of the inflatable body 10. The retainer trough 30 and the bottom of the inflatable body 10 may be substantially concentric and semi-circular.

The retainer trough 30, which is designed to support and hold the present invention through all stages of operation, secures the inflatable body 10 when the present invention is both inflated and deflated. The retainer trough 30 also holds the retainer ribs 20 and winches 50 and helps protect the present invention when it is deflated amid heavy seas.

The retainer trough 30 can be made of mild steel, painted in such a way as to protect the steel while remaining consistent with the operator's aesthetic requirements. The hull mounting feet 60, designed to mount the present invention to a ship, are attached to the retainer trough 30. In some embodiment, the retainer trough 30 can include an opening at the bottom surface of the retainer trough 30 to allow viewable access from below the retainer trough 30.

In use, the retainer trough 30 and the hull mounting feet 60 can be welded to the deck of the ship. The size of the retainer trough 30 and the fully inflated present invention can be suited to the size of the ship. The retainer trough 30 can be large enough to ensure that a ship's bow and the cargo on the ship are protected from turbulent winds approaching the bow of the ship.

The winches 50 can be electric winches designed to move the inner and outer bladders 70, 80 into position. One or more winches 50 can be attached along an outer surface of the retainer trough 30. In some embodiments, the winches 50 can be configured to regulate, and work in synchronization with, the air pressure in each inner and outer bladder 70, 80. The winches 50 can be driven by 12- or 24-volt DC power.

In some embodiments, the winch 50 may include a winch strap 40 used during inflation and deflation to pull in each inner and outer bladder 70, 80 as it is deflated and hold it in place in coordination with the winch 50. For example, the ends of the winch strap 40 can be attached the edge and the outer surface of the inflatable body 10 to pull in each inner and outer bladder 70, 80 as it is deflated. The winch 50 is used, in coordination with the winch strap 40, to pull the deflated bladders into the retainer trough 30.

Although the invention has been explained in relation to its preferred embodiment, it is to be understood that many other possible modifications and variations can be made without departing from the spirit and scope of the invention.

What is claimed is:

1. A nose cone system comprising:
   an inflatable body that forms a half dome shape when inflated;
   a plurality of retainer ribs attached to the inflatable body;
   a retainer trough positioned below the inflatable body, the retainer trough including a channel;
   a plurality of hull mounting feet coupled to the retainer trough;
   a plurality of winches attached along an outer surface of the retainer trough; and
   a plurality of winch straps attached to the inflatable body and the plurality of winches.

2. The nose cone system as claimed in claim 1, wherein the inflatable body includes a plurality of inner air bladders and a plurality of outer air bladders.

3. The nose cone system as claimed in claim 2, wherein the plurality of inner air bladders and the plurality of outer air bladders are made of polyvinyl chloride (PVC).

4. The nose cone system as claimed in claim 1, wherein the retainer ribs are made of mild steel tubing.

5. The nose cone system as claimed in claim 1, wherein the plurality of retainer ribs are rotatably mounted to the retainer trough.

\* \* \* \* \*